Feb. 6, 1945.   C. DUMELIN   2,368,917
ANKLE COUPLING FOR ARTIFICIAL FEET
Filed Feb. 4, 1944

Charles Dumelin
INVENTOR.

Patented Feb. 6, 1945

2,368,917

UNITED STATES PATENT OFFICE 2,368,917

ANKLE COUPLING FOR ARTIFICIAL FEET

Charles Dumelin, Detroit, Mich.

Application February 4, 1944, Serial No. 521,025

1 Claim. (Cl. 3—6)

My present invention relates to an ankle movement for artificial feet and more particularly to a coupling which restores normal walking conditions.

A further object of my invention is, I provide a simple ankle coupling consisting of two plate members secured with a leg attachment and artificial foot construction, a ball bearing seated in adjacent recesses and multiple springs held in opposite recesses between the plate members, a bracket with flanges overlapping both members rearwardly, one of said flanges being secured with the upper member and the other flange carrying a spherical set screw extending into a recess and pivotally supporting the lower member by engaging the ball bearing and multiple springs.

The invention consists in a coupling for the purpose specified, which is simple in construction and operation, efficient in use and which is constructed as hereinafter described and claimed.

Figure 1:
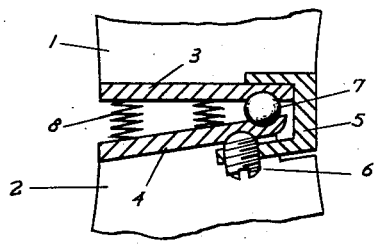
Fig. 1 illustrates a sectional view of the coupling, the two plate members are in their relative locked position.

In Fig. 1 of said drawing I denote 1 as part of the leg attachment and 2 as part of the artificial foot construction.

The coupling as shown comprises two plate members, the lower member being set at an angular position to provide walking movement. A ball bearing seated in recesses in the adjacent sides of the members and multiple springs held in opposite recesses of the members, a bracket with one flange secured to the upper member and another flange being provided with a spherical set screw extending into a recess of the lower member.

The adjacent faces of the members being provided with ball receiving recesses 13 and 16 and spring receiving recesses 14 and 15, the opposite side of the lower member being provided with recess 12 to receive the spherical set screw. Bracket 5 having two flanges overlapping both members at the rear, one of said flanges being secured with the upper member and the other flange carrying the spherical set screw in tap 17.

The coupling consisting of two plate members 3 and 4, a ball bearing 7, multiple springs 8, 9, 10 and 11, a bracket 5 carrying a spherical set screw 6.

Figure 5:
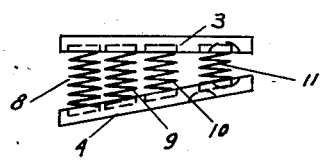
Fig. 5 is an elevation of the two plate members showing the springs therebetween.
Figure 6:
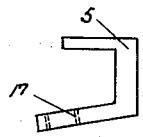
Figs. 6 and 7 are elevations of the bracket.
Figure 7:
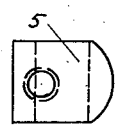
Figure 8:
Fig. 8 is an elevation of a spring.
Figure 9:
Fig. 9 is an elevation of the spherical set screw.

The parts are assembled as indicated in Figs. 1 and 5 of the drawing.

Bracket 5 is secured to the upper member 3, the ball bearing 7 is inserted between the two members, the spherical set screw 6 is inserted into tap 17 in the flange of the bracket and the springs are inserted in their respective recesses, after the spherical set screw is turned to the desired locking position.

The spring tension being terminated by the weight of the person.

Figure 2:
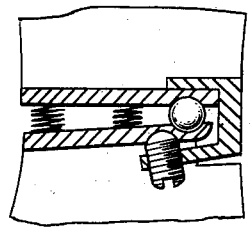
Fig. 2 is another sectional view showing the coupling in an engaged position.
Figure 3:
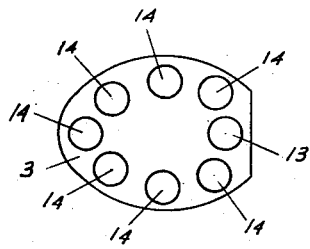
Fig. 3 is a plan view of the upper plate member having an outer contour of an ankle, the recesses for the springs are shown in their relative position, another recess at the rear is provided for the ball bearing.
Figure 4:
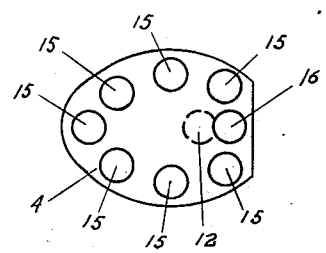
Fig. 4 is a plan view of the lower plate member illustrating the position of recesses for the springs, the ball bearing and spherical set screw.

The coupling being set in the following manner, Fig. 1 illustrates the leg with the artificial foot in a short step forward position, Fig. 2 represents the opposite leg in a large step forward position.

Further the structure of the coupling is such as to provide a resilient movement while walking, running or balancing the body.

From the above it can be seen I have provided an exceptionally efficient, strong and inexpensive coupling for the purpose intended.

What I claim and desire to secure by Letters Patent is:

An ankle coupling adapted for normal walking, having two plate members secured with a leg attachment and artificial foot construction, the lower member being set to a given angular position, the rear of the members being spaced apart by means comprising a ball bearing inserted in adjacent recesses, multiple springs held in opposite recesses of the members, a bracket with flanges overlapping both members rearwardly, one of said flanges being secured to the upper member and the other flange of the bracket carrying a spherical set screw extending into a recess and pivotally supporting the lower member by engaging the ball bearing and spring elements.

CHARLES DUMELIN.